(Model.) 2 Sheets—Sheet 1.
I. T. HARDY.
MACHINE FOR DRESSING TOBACCO.
No. 363,229. Patented May 17, 1887.
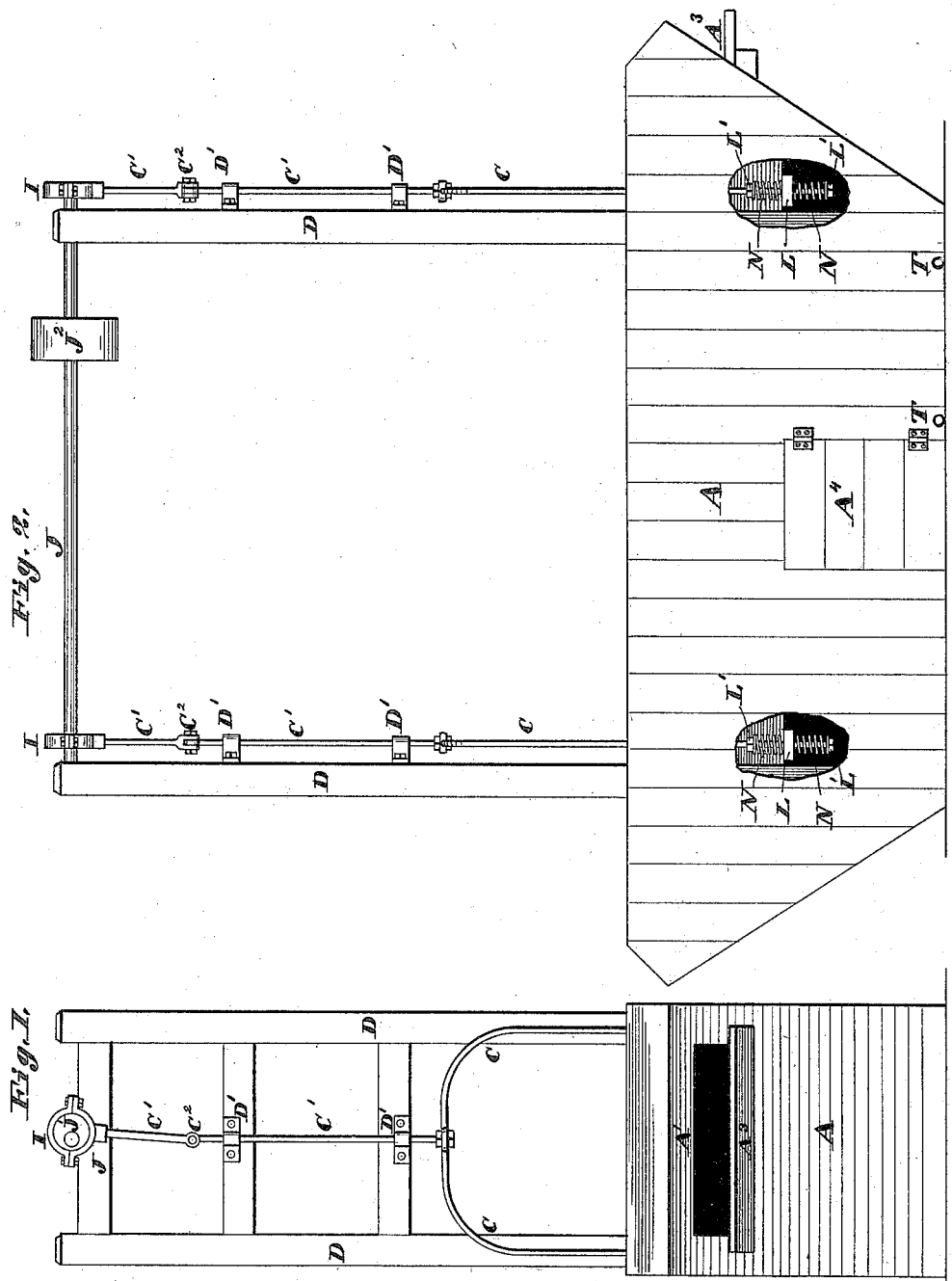
Attest:
Geo. L. Wheelock
Victor A. Lewis
Inventor:
I. T. Hardy
By Knight Bros
Attys (Model.)
2 Sheets—Sheet 2.
I. T. HARDY.
MACHINE FOR DRESSING TOBACCO.
No. 363,229. Patented May 17, 1887.
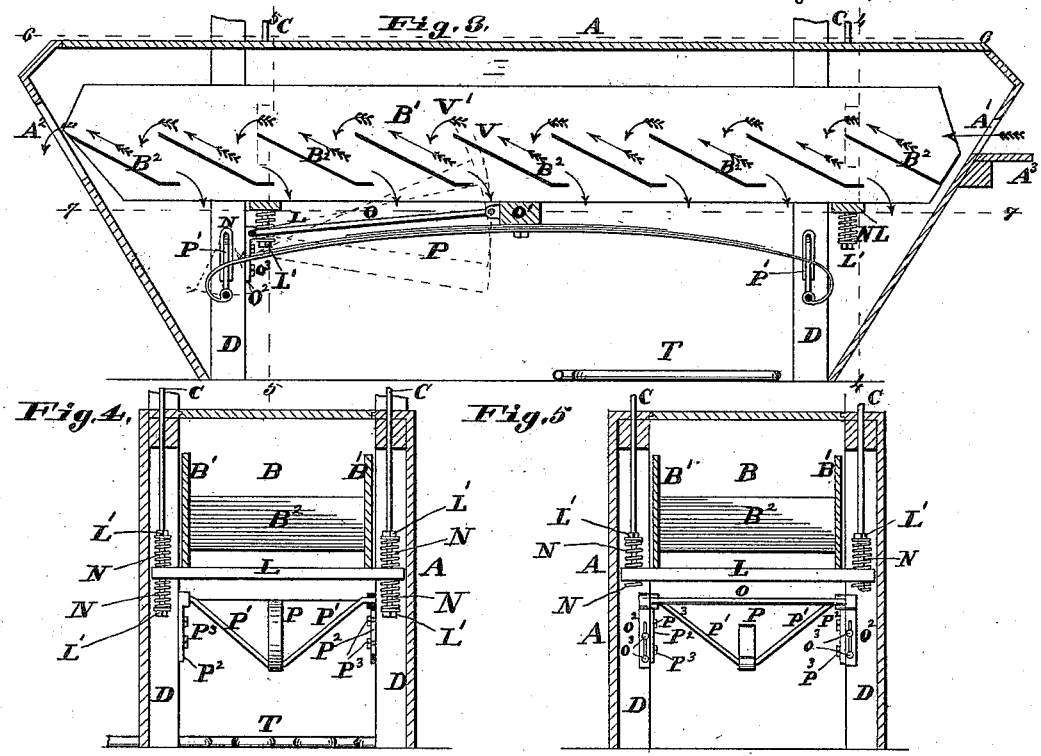
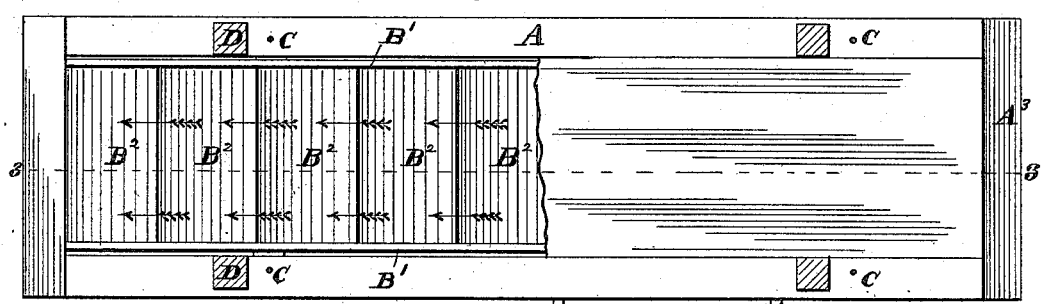
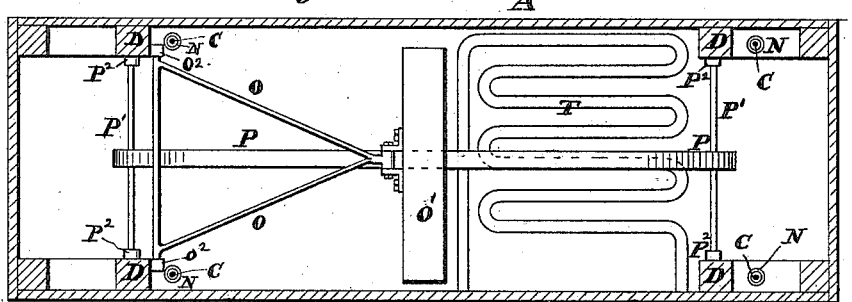
Attest:
Geo. L. Wheelock
Victor A. Lewis
Inventor:
I. T. Hardy
By Knight Bros
Attys

UNITED STATES PATENT OFFICE.

ISHAM T. HARDY, OF ST. LOUIS, MISSOURI, ASSIGNOR TO THE CATLIN TOBACCO COMPANY, OF SAME PLACE.

MACHINE FOR DRESSING TOBACCO.

SPECIFICATION forming part of Letters Patent No. 363,229, dated May 17, 1887.

Application filed August 9, 1884. Serial No. 140,120. (Model.)

*To all whom it may concern:*

Be it known that I, ISHAM T. HARDY, of the city of St. Louis, in the State of Missouri, have invented a certain new and useful Improvement in Machines for Dressing Tobacco, of which the following is a full, clear, and exact description, reference being had to the accompanying drawings, forming part of this specification, and in which—

Figure 1 is an end view. Fig. 2 is a side elevation, part broken away. Fig. 3 is a vertical section taken on line 3 3, Fig. 6. Fig. 4 is a vertical transverse section taken on line 4 4, Fig. 3. Fig. 5 is a similar view taken on line 5 5, Fig. 3. Fig. 6 is a horizontal longitudinal section taken on line 6 6, Fig. 3, part of the top of the box or chamber being broken away. Fig. 7 is a horizontal longitudinal section taken on line 7 7, Fig. 3.

My invention relates to a machine for dressing fine-cut tobacco; and it consists in features of novelty hereinafter fully described, and pointed out in the claims.

Referring to the drawings, A represents a box or chamber having a receiving-opening, A', and a delivery-opening, $A^2$, a table, $A^3$, being located at the former. Within the box is a frame, B, consisting of side pieces, B', and inclined strips $B^2$, made fast to and connecting the side pieces. The lower edges of strips $B^2$ are preferably turned out of an inclined into a horizontal position, as shown in Fig. 3. This frame B is supported by yokes C on the lower ends of rods C', supported by brackets or boxes D', secured to posts D, extending above the box. The upper ends of the rods are made fast to rings I, surrounding eccentrics J' on a shaft, J, provided with a driving-pulley, $J^2$, and supported by the posts D or by other suitable means. The rods are preferably jointed at $C^2$. (See Figs. 1 and 2.) It will thus be seen that as the shaft J turns the frame B will be raised and lowered.

The lower ends of the yokes C are preferably made fast to the frame B by means of cross-pieces L, secured to the frame, and through which the ends of the yokes pass and are held by nuts L', between which and the cross-pieces, both above and below, are springs N, that give a cushioning effect to the frame as its directions of movement are changed, so that the movement of the frame is less harsh and abrupt than it would be in the absence of the springs.

To cause the forward movement of the tobacco on the frame it is necessary that the frame should be caused to move out of a perpendicular or vertical line in the arc of a circle, and this I accomplish by means of a bar, O, secured by one end to a cross-piece, O', made fast to the frame B near its middle, and by its other end to two of the posts D or other suitable stationary objects, by brackets $O^2$, that are slotted to receive their retaining-bolts $O^3$. (See Figs. 4 and 5.) By moving the brackets up or down, the arc of the circle upon which the frame is made to move may be made larger or smaller, to cause the tobacco to be moved faster or slower, as desired. If the outer end of the frame or bar O, for instance, is in the position shown in Fig. 3, the frame B will be moved upon a circle indicated by dotted line V, and by lowering the outer end of the bar to the point marked X the frame will be moved upon a circle indicated by dotted line V', and thus the speed with which the tobacco moves through the machine may be regulated at will. To cause the table to be moved thus on the arc of a circle without jarring it, a leaf-spring, P, is made fast by its middle to the cross-piece O', and by its ends to the posts D by rods or bars P', (see Fig. 7,) slotted brackets $P^2$, and bolts $P^3$.

The tobacco is heated as it is passed through the box by a steam or hot-air pipe, T, at the bottom of the box. (See Figs. 3, 4, and 7.)

By raising or lowering the spring P by means of the slotted brackets and bolts $P^3$ its tension may be kept uniform.

The operation is as follows: The box being heated by the pipe T, the frame B is put into motion, as described. The tobacco to be dressed is then spread upon the table $A^3$ and pushed through the opening A' onto the frame, falling upon the first inclined cross-piece $B^2$. In the upward movement of the frame the tobacco is tossed up off the cross-pieces, and before it can fall again the frame has made its downward and backward movement, so that the tobacco lights on the cross-pieces a little farther up than where it left them, and thus it is moved forward along the frame, falling over the upper edge of one cross-piece onto the lower part of the next cross-piece, as indicated by full arrows, Fig. 3, the "shorts" falling from the lower edges of the cross-pieces (see featherless arrows, Fig. 3) to the bottom of the box, from where they may be removed through a door, A⁴. When the tobacco reaches the delivery end of the frame, it is discharged through the opening A², and by this time the shorts are removed and the matted parts thoroughly loosened up.

I claim as my invention—

1. In a tobacco-dressing machine, the combination of a box, a frame located within the box, having side pieces and cross-strips, cross-pieces secured to the frame, yokes connected with the cross-pieces for supporting the frame, driving-shaft having eccentrics, rods and rings connecting the yokes to the eccentrics, and means for moving the frame longitudinally, substantially as and for the purpose set forth.

2. In a tobacco-dressing machine, the combination of the box, frame located within the box, and consisting of side pieces and inclined cross-strips, yokes secured to the frame by cross-pieces, springs, and nuts, rods secured to the upper parts of the yokes and having rings on their upper ends, eccentrics on a driving-shaft fitting within said rings, and means for causing the frame to move out of a vertical line and for heating the interior of the box, substantially as and for the purpose set forth.

3. In a tobacco-dressing machine, in combination with the box and vibrating frame having cross-strips, the bar connecting the frame to a fixed object to cause the frame to move out of a vertical line, for the purpose set forth.

4. In a tobacco-dressing machine, in combination with the box and vibrating frame having cross-strips, the bar secured by one end to the frame and adjustably secured by its other end to a fixed support, substantially as and for the purpose set forth.

5. In a tobacco-dressing machine, in combination with the box and vibrating frame having cross-strips, the bar and spring connecting the frame to a fixed object to cause it to be moved out of a vertical line, substantially as shown and described, for the purpose set forth.

ISHAM T. HARDY.

In presence of—
GEO. H. KNIGHT,
SAML. KNIGHT.